Oct. 4, 1955                D. H. BLATT                2,719,566
METHOD OF AND MACHINE FOR MAKING
A TRANSPARENT CORRUGATED BOARD
Filed Dec. 12, 1951
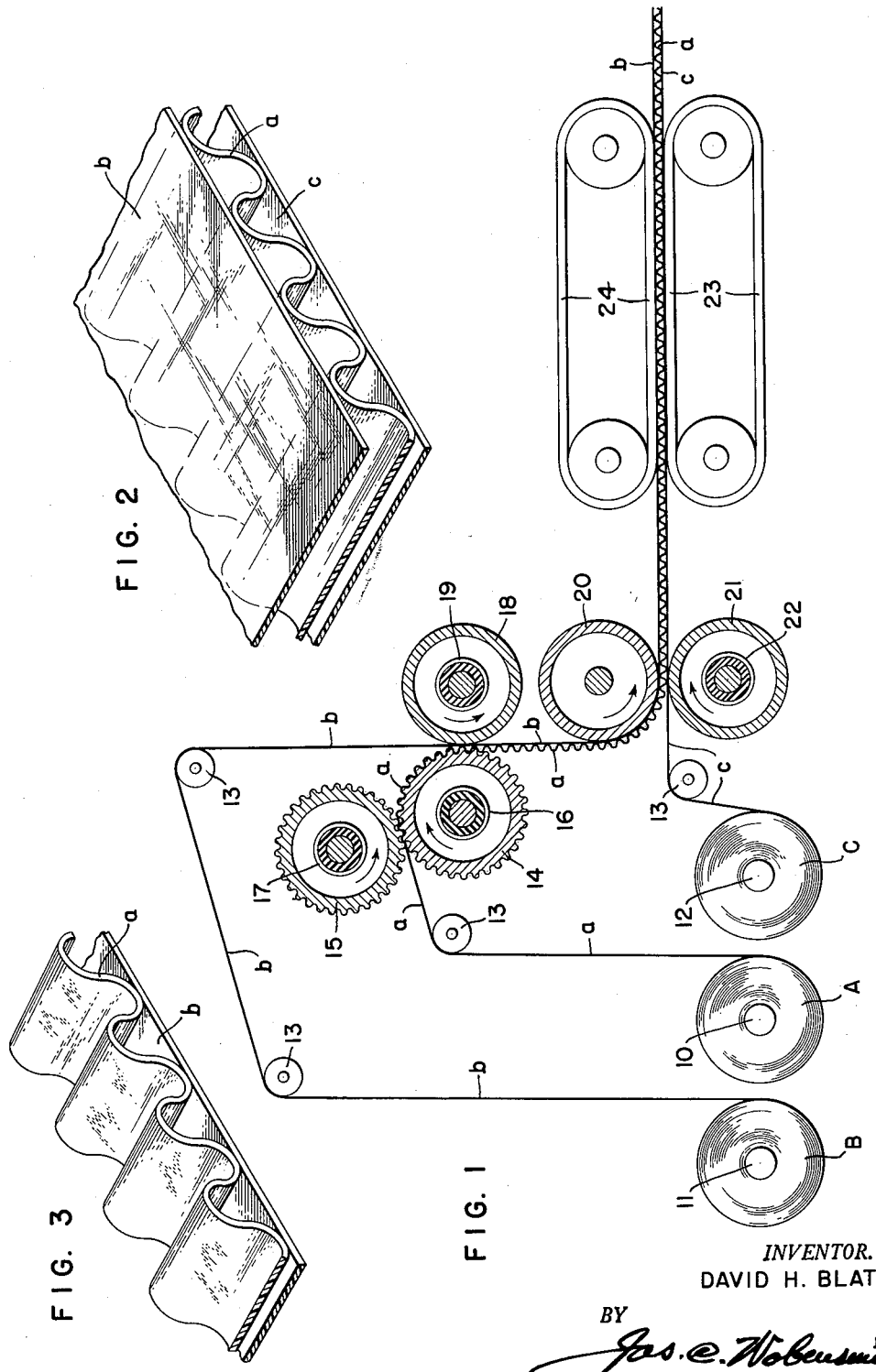
INVENTOR.
DAVID H. BLATT
BY
Jas. C. Wobensmith
ATTORNEY.

United States Patent Office 2,719,566
Patented Oct. 4, 1955

2,719,566

METHOD OF AND MACHINE FOR MAKING A TRANSPARENT CORRUGATED BOARD

David H. Blatt, Philadelphia, Pa., assignor to Associated Packaging Company, Philadelphia, Pa., a corporation of Pennsylvania Application December 12, 1951, Serial No. 261,171

11 Claims. (Cl. 154—32)

This invention relates to a transparent corrugated board, and to a method and apparatus for making the same, and it relates more particularly to the production of a stiff transparent corrugated board which may be used for the formation of boxes and containers for various products, whereby the same may be packed in attractive and discernible form for the purpose of enhancing the sales of such products.

Heretofore no one has produced a satisfactory transparent corrugated board adapted for the purpose of making boxes and containers. It was believed among those familiar with the properties of webs or sheets of cellophane and the like that it was not possible to make a usable corrugated board of such materials, and particularly at the speed which would be required for the economical production of such a board. It was also thought by those familiar with the properties of regenerated cellulosic sheets or webs that any attempt to make a corrugated board of such materials would result in a product which would not be sufficiently rigid, and at the same time transparent, for the purpose of packaging various articles, and particularly food stuffs, so that the contents could be perceived, and the sales thereof stimulated by the attractive appearance thereof.

One reason for the belief that it would not be possible to make a corrugated board of cellophane or the like was the extreme thinness of the sheets, which as commonly furnished are of a thickness from nine ten-thousandths to sixteen ten-thousandths of an inch whereas the paper webs or sheets commonly used for the making of corrugated board are ordinarily much thicker.

The principal object of the present invention is to provide a board adapted for use in making boxes and other containers having transparent walls, which will be sufficiently rigid for its intended purpose, and which may be readily made by suitable machinery and by an economical process.

A further object of the invention is to provide a novel process for the making of transparent corrugated board of the character aforesaid.

A further object of the invention is to provide novel means for the manufacture of transparent corrugated board of the character aforesaid.

The nature and characteristic features of the present invention will be more readily understood from the following description, taken in connection with the accompanying drawing forming part thereof, in which:

Figure 1 is a transverse section, illustrating more or less schematically, a preferred method of and apparatus for making transparent corrugated board of regenerated cellulosic webs or sheets;

Fig. 2 is a perspective view, considerably enlarged, of a small piece of transparent corrugated board embodying the present invention; and Fig. 3 is a similar view of a board comprising a single flat sheet having a corrugated sheet mounted thereon and secured thereto, which may comprise either an intermediate form of the board as shown in Fig. 2, or the same may be used in the form shown when stiffness is required in but one direction for certain uses.

It should of course be understood that the description and drawing herein are illustrative merely, and that various modifications and changes may be made in the structures and arrangements shown without departing from the spirit of the invention.

Referring now more particularly to Fig. 1 of the drawing, as therein shown, A, B, and C, are rolls of transparent regenerated cellulosic webs, said rolls being mounted on shafts 10, 11 and 12, respectively. The material used is of the heat sealable type, that is, of the kind which when two sheets are juxtaposed and a sufficient amount of heat and pressure applied at a given place, the two sheets will adhere to each other at that place.

From the roll A is fed the web or sheet $a$ which eventually forms the intermediate or fluted portion of the board shown in Fig. 3.

From the roll B is fed the web or sheet $b$ which eventually becomes the upper flat or face sheet of the board shown in Fig. 2, or the lower sheet of the board shown in Fig. 3.

From the roll C is fed the web or sheet $c$ which eventually becomes the lower or bottom sheet of the board shown in Fig. 2.

The several webs are fed over idler rollers 13 disposed at suitable locations for the purpose of guiding the webs through the forming and pressing rolls as hereinafter set forth.

Sheet $a$ is separately fed between fluted rolls 14 and 15, which intermesh so that as the web or sheet $a$ is fed therebetween, the same will be suitably shaped and formed to provide the desired flutes or corrugations therein.

The corrugated sheet $a$ is caused to remain within the flutes of the roll 14 a sufficient period of time during which time it is heated to a degree to cause the sheet to be molded and formed in the desired fluted shape.

It has been found that when a proper amount of heat is applied to the sheet and the sheet held in the corrugated shape until the same has been permitted to cool, or, in the alternative until it is otherwise secured against returning to the flat form by having the ridges of the several corrugations heat-fused to the facing sheets $b$ and $c$ hereinafter referred to, the flutes or corrugations will be permanently formed in the intermediate sheet.

In fact, when the proper amount of heat is applied to the corrugated sheet $a$ it becomes molded into such permanent corrugated shape, that it acquires a property of elasticity, so that if and when stretched longitudinally and then released, it will return to its molded corrugated shape.

In this property of elasticity, it differs from corrugated paper or any other corrugated medium in that they do not return to the original corrugated shape after being stretched.

It is believed that the formation of such corrugated cellulosic medium is novel. The importance of this molded, shape-retaining, corrugated medium, can be seen in the fact that it supplies the support for the one or two flat sheets of regenerated cellulose that are subsequently fused to it, as distinguished from the formation of corrugated board made from paper or the like, where the one or two flat sheets of paper or the like, when attached by adhesive to the corrugated paper medium, furnish the support for said corrugated medium.

It has also been found that by making the several flutes and convolutions of the sheet $a$ relatively small, a more satisfactory transparent corrugated board may be produced. For example, by making the center distances of the successive flutes of the sheet $a$ of a dimension of approximately one-twelfth of an inch, an acceptable board has been produced, but it should be understood that this dimension may and will be varied somewhat by reason of differing thicknesses and other characteristics of the web employed for forming the corrugated portion of the board.

For the purpose of obtaining and maintaining the requisite temperature of the fluted forming rolls 14 and 15, the said rolls are provided with internal electric heaters 16 and 17 respectively, which will, of course, be controllable by any preferred means, not shown, as to their heat emission factors so as to insure the application of the proper amount of heat to the web or sheet *a* during the shaping of the corrugations therein by said fluting rolls.

Arranged in proximity to the fluted forming roll 14 is a pressure roll 18, also provided with an internal controllable electric heater 19, which is so controlled as to maintain the roll 18 at a somewhat higher temperature than that of the fluted corrugating rolls 14 and 15.

The web *b* which comes from the roll B is fed between the roll 14, with the corrugated sheet *a* carried around thereby from the place of the formation of the corrugations, to the pressure roll 18. By reason of the additional heat and the pressure applied at this point by the pressure roll 18, the outermost surfaces of the corrugations of the sheet *a* will be caused to adhere or be fused to the web *b*.

It will be apparent that adherence of the top surfaces of the ridges of the corrugated sheet to web *b* will be assisted by the head supplied by the roll 14, although the amount of heat supplied by said roll is in itself not sufficient to cause adherence between the top surfaces of the flutes of the sheet *a* and the abutting portions of the face of the sheet *b* when the same are brought together, but the greater heat, for the purpose of bringing about the adherence or fusion, is supplied through the medium of the heater within the roll 18.

The composite sheet, made up of the corrugated sheet *a* and the top sheet *b*, which has been secured to the top surface portions of the corrugations of the sheet *a*, passes from the rolls 14 and 18 and around a roll 20 which, however, need not be, and preferably is not, heated.

Arranged adjacent the roll 20 is another roll 21 which is also provided with an internal controllable electric heater 22. The web *c* which is fed from the roll C passes between the rolls 20 and 21 at which point heat is applied by means of the electric heater 22 within the roll 21 which will cause the sheet *c* to adhere to the abutting bottom surface portions of the corrugations of the sheet *a*, and thus finish the formation of the board. However, the board formed as above set forth is preferably and finally passed between pressure belts 23 and 24 which will serve to hold the sheets together until the completed board has cooled sufficiently to insure the adherence of the contiguous surfaces of the several sheets.

It will be noted that by means of the above described method and machine there will be produced a novel and useful form of transparent corrugated board which will have a wide range of usefulness in the packaging field and which may be economically produced.

The present invention should not be confused with the attempts which have heretofore been made to provide a transparent corrugated board by forming the intermediate web with the desired corrugations and then applying an adhesive, such as acetone, to the ridges of the corrugated web in an attempt to secure the flat webs on each face.

In the practice of the present invention it is not necessary to provide for the evaporation of the solvent to effect the adhesion which is quite difficult to accomplish, in a product of this character, particularly where the spacing of the corrugations may be and preferably is smaller than the customary size of the corrugations of the ordinary corrugated paper board.

I claim:

1. The method of making transparent corrugated board which consists in permanently forming a web of regenerated heat-sealable cellulose into self-sustaining corrugations at a temperature below the fusion temperature, and then feeding another web of regenerated heat-sealable cellulose in flat form to contact with the top ridges of the corrugated web and simultaneously applying heat thereto at a temperature to cause the flat web to adhere by fusion to the top ridges of the corrugated web.

2. The method of making transparent corrugated board which consists in permanently forming a web of regenerated heat-sealable cellulose into self-sustaining corrugations with a flute spacing of about one-twelfth of an inch, then feeding another web of regenerated heat-sealable cellulose in flat form to contact with the top ridges of the corrugated web and simultaneously applying heat thereto at a temperature to cause the flat web to adhere by fusion to the top ridges of the corrugated web, and then feeding another flat web of regenerated heat-sealable cellulose to the bottom ridges of the corrugated web and simultaneously applying heat thereto at a temperature to cause said flat web to adhere by fusion to the bottom ridges of the corrugated web.

3. The method of making transparent corrugated board which consists in corrugating a web of regenerated heat-sealable cellulose, then feeding another web of regenerated heat-sealable cellulose in flat form to contact with the top ridges of the corrugated web and simultaneously applying heat thereto at a temperature to cause the flat web to adhere by fusion to the top ridges of the corrugated web, and then feeding another flat web of regenerated heat-sealable cellulose to the bottom ridges of the corrugated web and simultaneously applying heat thereto at a temperature to cause said flat web to adhere by fusion to the bottom ridges of the corrugated web.

4. The method of making transparent corrugated board which consists in corrugating a web of regenerated heat-sealable cellulose at a temperature below the sealing temperature, then feeding another web of regenerated heat-sealable cellulose in flat form to contact with the top ridges of the corrugated web and simultaneously applying heat thereto at a temperature to cause the flat web to adhere by fusion to the top ridges of the corrugated web, and then feeding another flat web of regenerated heat-sealable cellulose to the bottom ridges of the corrugated web and simultaneously applying heat thereto at a temperature to cause said web to adhere by fusion to the bottom ridges of the corrugated web.

5. The method of making transparent corrugated board which consists in corrugating a web of regenerated heat-sealable cellulose at a temperature below the sealing temperature, then feeding another web of regenerated heat-sealable cellulose in flat form to contact with the top ridges of the corrugated web and simultaneously applying heat thereto at a temperature to cause the flat web to adhere by fusion to the top ridges of the corrugated web, then feeding another flat web of regenerated heat-sealable cellulose to the bottom ridges of the corrugated web and simultaneously applying heat thereto at a temperature to cause said web to adhere by fusion to the bottom ridges of the corrugated web, and thereafter maintaining pressure on the formed board while the same is cooling.

6. The method of making transparent corrugated board which consists in corrugating a web of heat-sealable cellophane at a temperature below the sealing temperature, then feeding another web of heat-sealable cellophane in flat form to contact with the top ridges of the corrugated web and simultaneously applying heat thereto at a temperature to cause the flat web to adhere by fusion to the top ridges of the corrugated web, then feeding another flat web of heat-sealable cellophane to the bottom ridges of the corrugated web and simultaneously applying heat thereto at a temperature to cause said flat web to adhere by fusion to the bottom ridges of the corrugated web, and thereafter maintaining pressure on the formed board while the same is cooling.

7. A machine for making transparent corrugated board comprising a pair of fluted rolls between which a web of regenerated cellulose is passed to form the corrugated portion of the board, controllable heating means in said rolls adapted to set the corrugations initially in said web, a pressure roll mounted adjacent one of said fluted rolls for pressing a flat web of regenerated cellulose against the top ridges of the corrugated web, and controllable heating means in said pressure roll adapted to fuse said webs to each other where the same are in contact.

8. A machine for making transparent corrugated board comprising a pair of fluted rolls between which a web of regenerated cellulose is adapted to be passed to form the intermediate corrugated portion of the board, controllable heating means in said rolls adapted to set the corrugations initially in said web, a pressure roll mounted adjacent one of said fluted rolls for pressing a flat web of regenerated cellulose against the top ridges of the corrugated web, controllable heating means in said pressure rolls adapted to fuse said webs to each other where the same are in contact, a pair of pressure rolls adapted to press another flat web of regenerated cellulose against the bottom ridges of the corrugated web, controllable heating means in one of said pressure rolls adapted to fuse said webs to each other where the same are in contact, and pressure means adapted to hold together the several webs of the completed board during the cooling of the same.

9. A machine for making transparent corrugated board comprising a pair of fluted rolls between which a web of regenerated cellulose is passed to form the intermediate corrugated portion of the board, controllable heating means in said rolls adapted to set the corrugations initially in said web, a pressure roll mounted adjacent one of said fluted rolls for pressing a flat web of regenerated cellulose against the top ridges of the corrugated web, controllable heating means in said pressure roll adapted to fuse said webs to each other where the same are in contact, a pair of pressure rolls adapted to press another flat web of regenerated cellulose against the bottom ridges of the corrugatd web, and controllable heating means in one of said pressure rolls adapted to fuse said webs to each other where the same are in contact.

10. A machine for making transparent corrugated board comprising a pair of fluted rolls having flute spacing of approximately one-twelfth of an inch and between which a web of regenerated cellulose is adapted to be passed to form the intermediate corrugated portion of the board, controllable heating means in said rolls adapted to set the corrugations initially in said web, a pressure roll mounted adjacent one of said fluted rolls for pressing a flat web of regenerated cellulose against the top ridges of the corrugated web, controllable heating means in said pressure roll adapted to fuse said webs to each other where the same are in contact, a pair of pressure rolls adapted to press another flat web of regenerated cellulose against the bottom ridges of the corrugated web, and controllable heating means in one of said pressure rolls adapted to fuse said webs to each other where the same are in contact.

11. A machine for making transparent corrugated board comprising a pair of fluted rolls having flute spacing of approximately one-twelfth of an inch and between which a web of regenerated cellulose is adapted to be passed to form the intermediate corrugated portion of the board, controllable heating means in said rolls adapted to set the corrugations initially in said web, a pressure roll mounted adjacent one of said fluted rolls for pressing a flat web of regenerated cellulose against the top ridges of the corrugated web, controllable heating means in said pressure roll adapted to fuse said webs to each other where the same are in contact, a pair of pressure rolls adapted to press another flat web of regenerated cellulose against the bottom ridges of the corrugated web, controllable heating means in one of said pressure rolls adapted to fuse said webs to each other where the same are in contact, and pressure means adapted to hold together the several webs of the completed board during the cooling of the same.

References Cited in the file of this patent

UNITED STATES PATENTS

| | | |
|---|---|---|
| 2,121,013 | Brown | June 21, 1938 |
| 2,221,309 | Gazelle | Nov. 12, 1940 |
| 2,355,559 | Renner | Aug. 8, 1944 |
| 2,423,870 | Blessing | July 7, 1947 |
| 2,429,482 | Munters | Oct. 21, 1947 |

FOREIGN PATENTS

| | | |
|---|---|---|
| 528,545 | Great Britain | Oct. 31, 1940 |
| 874,638 | France | May 18, 1942 |